C. A. BUBB.
VALVE FOR FLUSH TANKS.
APPLICATION FILED MAY 7, 1919.

1,309,507.

Patented July 8, 1919.

Inventor
Clarence A. Bubb
By Frank H. Hough
Attorney

UNITED STATES PATENT OFFICE.

CLARENCE A. BUBB, OF DETROIT, MICHIGAN, ASSIGNOR OF ONE-HALF TO PETER H. RICH, OF DETROIT, MICHIGAN.

VALVE FOR FLUSH-TANKS.

1,309,507.      Specification of Letters Patent.      Patented July 8, 1919.

Application filed May 7, 1919. Serial No. 295,311.

*To all whom it may concern:*

Be it known that I, CLARENCE A. BUBB, a citizen of the United States, residing at Detroit, in the county of Wayne and State of Michigan, have invented certain new and useful Improvements in Valves for Flush-Tanks, of which the following is a specification.

This invention relates to new and useful improvements in flush bulbs, for tanks and other purposes, and consists essentially in the provision of a valve made of spongy like rubber material having air cells throughout its makeup, and of a buoyant nature.

A valve of this nature will be soft and pliable and will conform to any irregularities in the valve seat, which are pronounced in valves of different kinds, especially when old and worn.

The invention comprises various other details of construction, combination and arrangement of parts which will be hereinafter fully described, shown in the accompanying drawings and then specifically defined in the appended claims.

Figure 1:
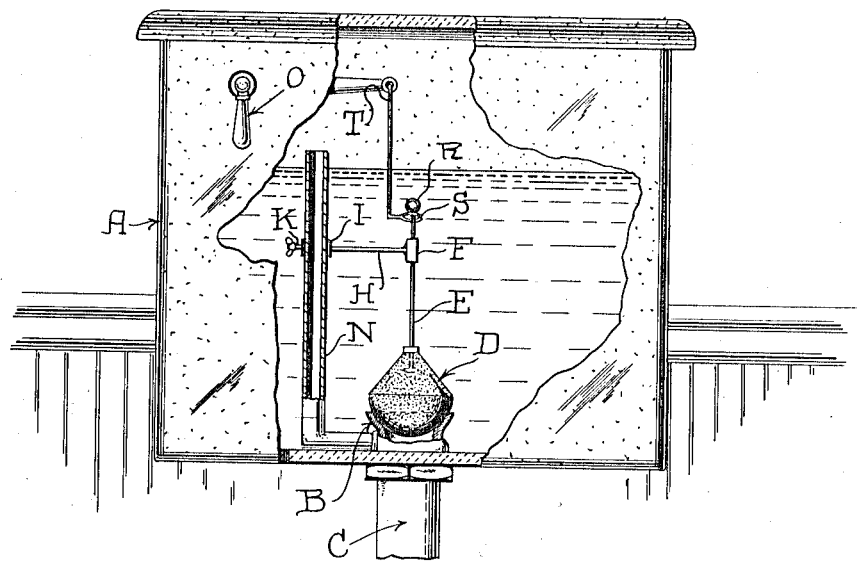
Figure 2:
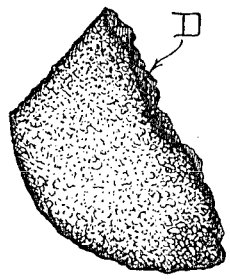

My invention is illustrated in the accompanying drawings which, with the letters of reference marked thereon form a part of this application, and in which:

Figure 1 is a side elevation showing the application of my valve to a flush tank, and Fig. 2 is an enlarged detail view showing the cellular structure of the valve.

Reference now being had to the details of the drawings by letter:

A designates a flush box, B a valve about an exit opening leading from the pipe C. The valve D is made of a soft pliable, spongy like rubber, having myriads of air cells making the valve buoyant, and being pliable it will naturally conform to the irregularities in the valve seat. The valve is provided with a stem E movable through a collar F fixed to the bracket H, which has another collar I at one end carrying a set screw K. The collar I is mounted upon the vertically disposed rod N and held in different adjusted positions by means of the set screw.

A flushing lever O is pivotally mounted in the tank and carries at one end a rod T, the lower end of which is bent at right angles and provided with an eye S through which the rod F passes.

At the upper end of the rod F is a ball R, which abuts against the eye S when the flushing lever is tilted, for the purpose of causing the valve to rise from its seat.

Heretofore flush valves have been commonly hollow rubber, the wall of which is solid and of a single thickness and which is a disadvantage, because the constant suction on the flush ball when the tank is being flushed, and the receding of the valve will cause the ball to become irregular, being elongated by the bottom dropping down which throws the entire ball out of shape. In order to make the valve water-proof the ball of spongy-like rubber is immersed in a suitable water-proofing solution.

By the provision of a valve embodying the features of my invention, it will be noted that there are myriads of air cells in the mass of the spongy like rubber, and which will withstand the elements in the water and greatly prolong the usefulness of the valve, and which will also cause it to retain its shape after extensive usage.

What I claim to be new is:

1. A valve for flush tanks, etc., made up of a mass of spongy like rubber, having throughout its make-up air cells.

2. A valve for flush tanks, etc., made up of a mass of spongy like rubber, having throughout its make-up air cells, a rod attached to the valve, a stem, an adjustable bracket member mounted thereon, having a collar through which said rod is guided, and means for raising the valve.

3. A valve for flush tanks, etc., made up of a mass of spongy like rubber, having throughout its make-up air cells, a rod attached to the valve, a stem, an adjustable bracket member mounted thereon, having a collar through which said rod is guided, said rod having a ball at its upper end, a flush lever, a rod connected thereto and having its lower end angled, and provided with an eye through which said rod passes.

In testimony whereof I affix my signature.

CLARENCE A. BUBB.